United States Patent
Cubeta et al.

(10) Patent No.: US 6,951,464 B2
(45) Date of Patent: Oct. 4, 2005

(54) READING LEARNING TOOL WITH FINGER PUPPETS

(76) Inventors: Diana Cubeta, 40 Jean Ter., Parsippany, NJ (US) 07054; Susan McGuirl, 48 Moak Dr., Hazlet, NJ (US) 07730; Cynthia Swajkowski, 2711 Andrea Rd., Union, NJ (US) 07083

( * ) Notice: Subject to any disclaimer, the term of this patent is extended or adjusted under 35 U.S.C. 154(b) by 42 days.

(21) Appl. No.: 10/113,727

(22) Filed: Apr. 1, 2002

(65) Prior Publication Data

US 2003/0186198 A1 Oct. 2, 2003

(51) Int. Cl.$^7$ ............................................. G09B 17/00
(52) U.S. Cl. ..................................... 434/159; 434/178
(58) Field of Search ............................... 434/156, 159, 434/160, 161, 167, 172, 176, 178

(56) References Cited

U.S. PATENT DOCUMENTS

| | | | |
|---|---|---|---|
| 4,519,781 A | * 5/1985 | Boyd ........................ 434/156 |
| 4,583,952 A | 4/1986 | De La Paz Rios .......... 434/191 |
| 4,636,172 A | 1/1987 | Fredericks .................. 434/159 |
| D331,834 S | 12/1992 | Wallace ....................... D2/619 |
| D334,658 S | 4/1993 | Ivie ............................. D2/619 |
| D349,728 S | 8/1994 | Cheever ....................... D19/59 |
| D368,352 S | 4/1996 | Torres ......................... D2/619 |
| 5,507,649 A | 4/1996 | Troudet ....................... 434/233 |
| 5,906,492 A | * 5/1999 | Putterman ................... 434/169 |
| D423,050 S | 4/2000 | Rink et al. ................... D19/59 |
| 6,057,501 A | * 5/2000 | Hale ......................... 84/470 R |
| 6,142,785 A | 11/2000 | Williams ..................... 434/205 |
| 6,155,836 A | * 12/2000 | Hancock ..................... 434/188 |

OTHER PUBLICATIONS

J.L Hammett & Co., 2001 Early Learning Catalog, p. 96.*
Oriental Trading Company, Inc., 2002 Catalog, p. 50.
Declaration of Susan McGuirl describing a prior reading learning tool.
Becker School Supplies, 2000 Catalog, pp. 95, 98. J.L. Hammet & Co., 2001 Early Learning Catalog, p. 96.

* cited by examiner

*Primary Examiner*—Kurt Fernstrom
(74) *Attorney, Agent, or Firm*—Wolff & Samson PC

(57) ABSTRACT

A reading learning tool which uses finger puppets having letters thereon is provided. The puppets could include pictures of objects corresponding to the sound of the letter. The finger puppets can be worn by a student and can be arranged to correspond to a word. The student can use the sounds of the objects corresponding to the letters to assist in sounding out a word. A teacher can interact with a student by using a corresponding set of finger puppets. The student's finger puppets can be made of paper and the teacher's finger puppets can be larger and made of a more durable and visible material. The finger puppets can include more than one letter to accommodate word families and sound blends such as digraphs and diphthongs.

28 Claims, 10 Drawing Sheets

FRONT VIEW

BACK VIEW

FRONT VIEW

BACK VIEW

READING LEARNING TOOL WITH FINGER PUPPETS

BACKGROUND OF THE INVENTION

1. Field of the Invention

The present invention relates to a reading learning tool which uses finger puppets and more specifically to a reading learning tool including a plurality of finger puppets, each puppet having one or more letters thereon which can be placed on a student's hands to help a student learn to read.

2. Related Art

Teaching a young student or child to read is a long process. Initially, a child learns the letters of the alphabet and then, beginning with two and three letter words, the student is taught to string together the sounds of the letters to create words. Thereafter, this process can be used to sound out and spell longer words, eventually leading to reading and writing.

It is known that in order to help young students become familiar with the letters of the alphabet, including the way the letters look and how they sound, it is beneficial to allow such students to interact as much as possible with the letters and words. As such, there are numerous reading learning programs that include physical three dimensional representations of letters so that students can actually handle the letters. Likewise, it is known to represent the sounds of letters by correlating the names of objects beginning with the letter to the letter. For example, the sound of the letter "a" is typically first taught with reference to the word "apple," and the symbol of an apple is often times used to represent the letter "a." Numerous objects have been linked to letters to help students recollect the sound of the letters.

Another reading learning tool that has been employed by one of the inventors to help a young student to sound out a word is to count the letters in the word and hold up a corresponding amount of fingers. Then, the young student knows that it must make a sound corresponding to each of the fingers, i.e. each of the letters, to pronounce, and accordingly read, the word. As such, with the word "sat," a student would hold up three fingers, and make a sound corresponding to each finger, namely "s," "a," and "t" and in making those three sounds, slowly at first and then faster, the young student effectively sounds out and reads the word "sat."

What would be desirable, but has not been heretofore been provided, is a reading learning tool that allows a student to easily interact with letters which can be used by the student on his or her fingers to assist the student in reading and pronouncing words.

OBJECTS AND SUMMARY OF THE INVENTION

It is an object of the present invention to provide a reading learning tool which teaches a student to read by placing finger puppets on the student's fingers, the finger puppets having letters thereon for assisting the student to sound out a word.

It is another object of the present invention to provide a reading learning tool with finger puppets having letters, and pictures of objects that start with the letter, for assisting students to sound out words.

It is a further object of the present invention to provide a reading learning tool whereby both a student and a teacher can wear finger puppets with letters thereon for assisting the students to sound out words.

It is another object of the present invention to provide an affordable reading learning system including finger puppets which can be made of paper for a student to use, and which can be made of a sturdier material for a teacher to use.

The present invention relates to a reading learning tool including finger puppets having letters thereon which can be worn by a student. The letters can spell a word and using the puppets, a student can pronounce the letters to say the word. In addition to letters, objects that provide cues to the pronunciation of the letter can also be included on the finger puppet and can be arranged to correspond to a word. The student can use the sounds of the objects corresponding to the letters to sound out the word. A teacher can interact with a student by using a corresponding set of finger puppets. The student's finger puppets can be made of paper, and the teacher's finger puppets can be larger and made of a sturdier, more durable and more visible material. The finger puppets can include more than one letter to accommodate word families and sound blends such as digraphs and diphthongs.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention relates to a reading learning tool using finger puppets. A plurality of finger puppets are provided, each finger puppet having one or more letters thereon. A student learning to spell can place finger puppets corresponding to the letters of a word on his or her fingers and then make a sound corresponding to each puppet to sound out the word. A teacher can have a separate set of finger puppets to allow the teacher to demonstrate the technique. The teacher's puppets and, if desirable, the student's puppets can be supported by a peg stand when not in use. Importantly, in a preferred embodiment, the finger puppets include images of objects that provide pronunciation cues for the pronunciation of the letter or letters on the puppet. Typically, the object will start with the same sound as the letter, e.g., apple for the letter "a."

Figure 1A:
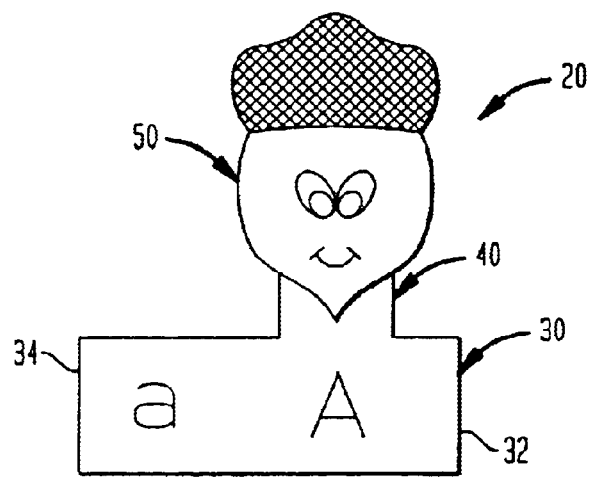
FIGS. 1A–1G show front views of examples of finger puppets used in connection with the present invention in unassembled form.

FIGS. 1A–1I show unassembled finger puppets according to the present invention. By unassembled, it is meant that the edges of the base have not yet been attached to form the base into a cylinder as will hereinafter be described. As shown in FIG. 1A, the finger puppet, generally indicated at 20, includes a generally rectangular base 30, a vertical support 40 and an object 50. The rectangular base 30 includes an indicia area for one or more letters. As shown in FIG. 1A, the letter "a" is on the rectangular base 30. Both the capital and lower case depiction of the letter can be used. The base has first and second edges 32 and 34, respectively. Extending from the rectangular base 30 is a vertical support 40 and interconnected with the vertical support 40 is an object 50.

Figure 1B:
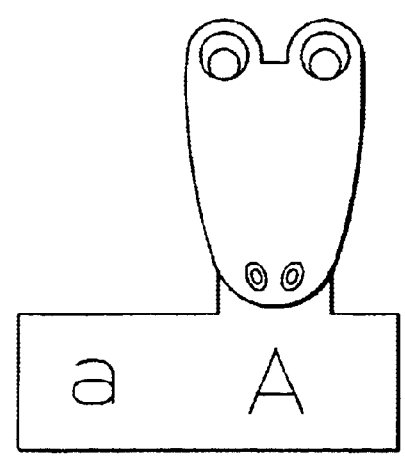
Figure 1C:
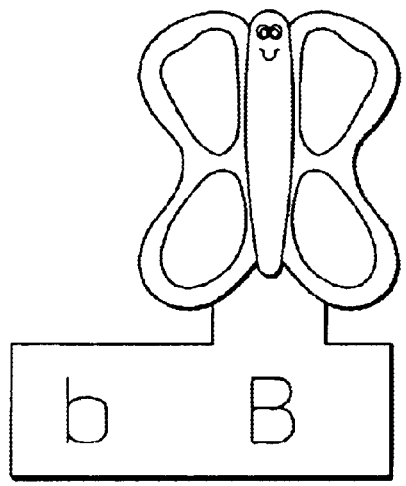
Figure 1D:
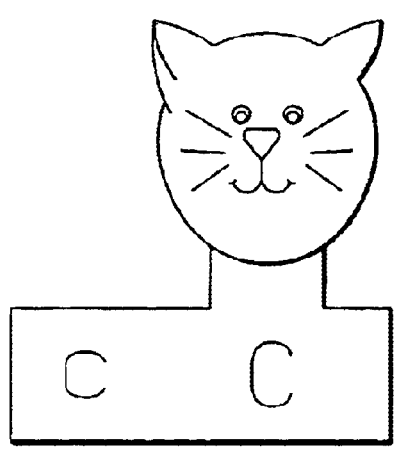
Figure 1E:
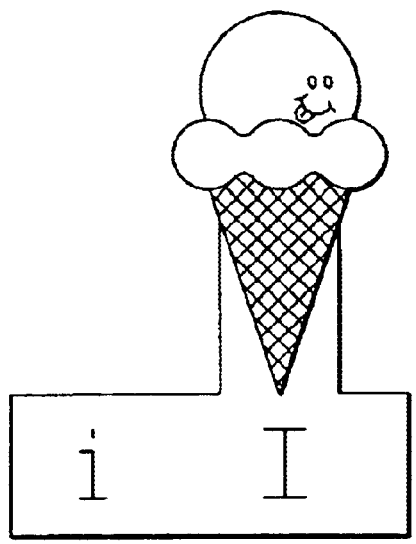
Figure 1F:
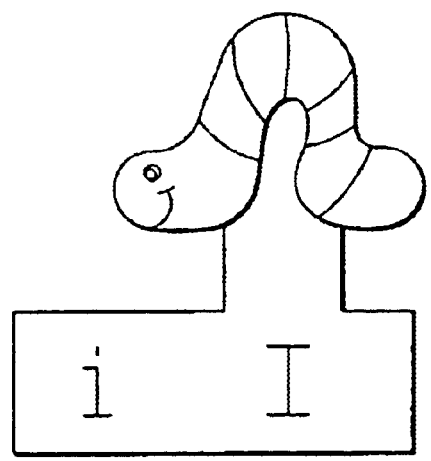
Figure 1G:
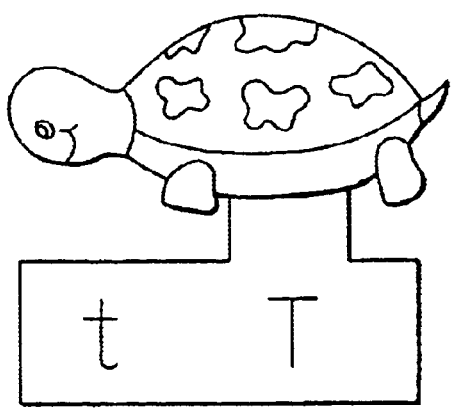
Figure 1H:
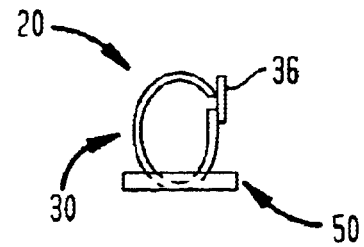
FIG. 1H shows a top view of such a finger puppet in an assembled form.

As shown in FIG. 1A, the finger puppet 20 bears the letter "a" and the object corresponding thereto is an acorn. As is known, the letter "a" can take on more than one sound and accordingly, as shown in FIG. 1B, another object can also be associated with the letter "a," namely, an alligator. FIG. 1C shows a butterfly associated with the letter "b." FIG. 1D shows a cat for the letter "c." FIG. 1E shows an ice cream cone as the object associated with the letter "i," while FIG. 1F shows an inch worm as another object for use in connection with the letter "i," as the letter "i" can have more than one sound. FIG. 1G shows a turtle as an object for the letter "t." Finger puppets can be made corresponding to each letter of the alphabet, as well as word families, diphthongs and digraphs, with corresponding objects related to the sounds thereof.

The finger puppets can be manufactured in any desirable manner known in the art. For example, the finger puppets can be made of any suitable synthetic or natural material. The finger puppets can be pre-manufactured and permanently labeled with letters and corresponding objects. Alternatively, pre-manufactured finger puppet blanks can have attachable and detachable letters and/or attachable and detachable objects. Letters and/or objects can be attached and detached to the finger puppet blanks by any means known in the art such as by a hook and loop fastening system. Clearly, it is also within the scope of the present invention to utilize any desired object to represent the sound of a letter.

Alternatively, as shown in FIGS. 1A–1G, finger puppets 20 can merely be printed on a paper page. Thereafter, a user, such as a student can cut the finger puppet 20 from the page. Alternatively, the finger puppets 20 can be attached to a page by perforations and detached from the page by breaking the perforations. Once the finger puppet 20 is separated from the page, the rectangular base section 30 can be rolled about itself and the edges 32 and 34 secured together by an adhesive such as tape 36 or other means to form a tube into which a student's finger can be inserted. The dimensions of the tube can be varied, and it might be desirable for the tube to extend the full height of the puppet. Importantly, if presented in this manner, the finger puppets 20 can be printed on color paper and/or could be colored by the students so they can have an opportunity to further gain familiarity with the letters and objects prior to use. Such paper finger puppets can be consumable so that when a spelling/reading lesson is over the puppets can be discarded. In another variation, blank finger puppets could be provided on a page or otherwise, and stamps of letters and/or images of objects or both could be used to place letters and/or images on the blank puppets.

Figure 1I:
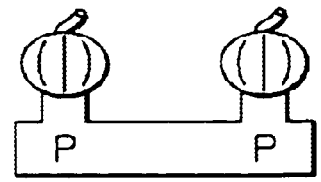
FIG. 1I shows an alternate embodiment of a finger puppet of the present invention in an unassembled form

With further reference to FIGS. 1A–1I, it should be noted that the letters can be presented as capital letters or lowercase letters or, as shown in the figures, both. As shown in FIG. 1A when the rectangular base 30 is formed into a cylinder, the letter "a" is depicted on forward and rearward facing areas of the finger puppet 20. This allows a student to gain familiarity with both upper and lowercase letters, and also allows one looking at the student, such as the teacher, to confirm the proper positioning of letters on a student's fingers. However, it should be noted that it is within the scope of the art to provide only capital letters, or only lowercase letters, and the letters could appear on the front and back of the finger puppets, or only on the front. Also, uppercase and lowercase letters can be depicted together on the forward and/or rearward areas of the finger puppet 20 if desired. FIG. 1I shows an embodiment of a finger puppet bearing the letter "p" along with an image of a pumpkin as the object. As can be seen, the image of the object can be positioned such that when the base is formed into a tube to create a finger puppet, the object can be seen from both the front and back faces of the finger puppet. If desirable, an uppercase letter could be presented on one side of the puppet, while a lowercase letter is presented on the other side, both associated with an object to allow one to use the puppet to represent an uppercase or lowercase letter.

Figure 2A:
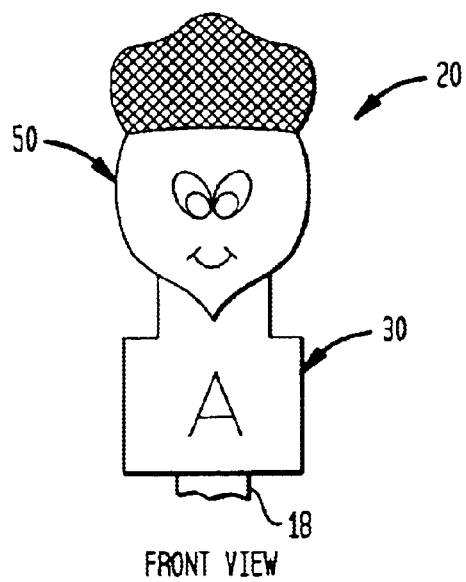
FIGS. 2A and 2B show front and back views of the finger puppet shown in FIG. 1A assembled and positioned on a student's finger.
Figure 2B:
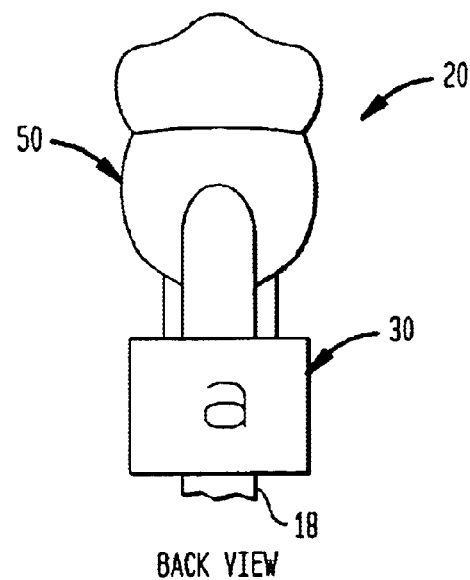

FIGS. 2A and 2B shows front and back views of the finger puppet of FIG. 1A formed into a finger puppet and positioned on a student's finger. As can be seen, the rectangular base 30 has been formed into a cylinder which fits about a wearer's finger 18 such that the letter "a" and corresponding object 50 is visible from the front, and the lowercase letter "a" is visible from the rear.

Figure 3A:
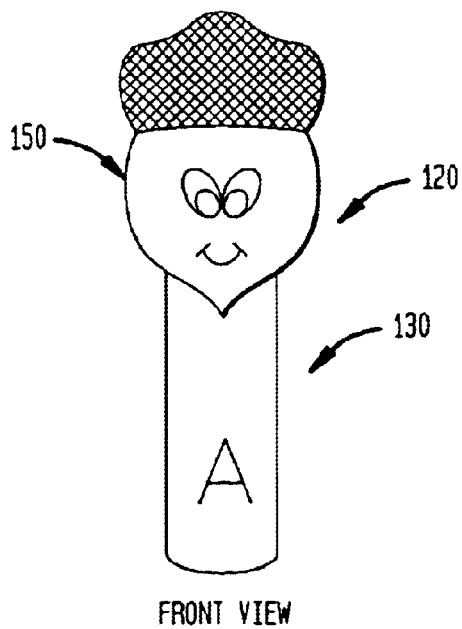
FIGS. 3A and 3B show a corresponding teacher's finger puppet for the letter "a."
Figure 3B:
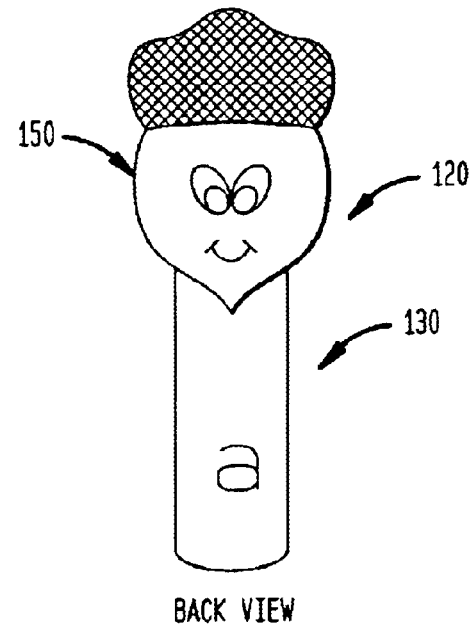

As shown in FIGS. 3A and 3B, in accordance with the present invention it is preferable, though not required, to have a teacher's set of finger puppets that corresponds to the student's finger puppets so that the teacher can demonstrate the use of the finger puppets. Like the student's finger puppets, the teacher's finger puppets can be manufactured in any way known in the art. However, because the teacher's finger puppets are expected to be visible from a greater distance, and are likely to be used over a longer time, it is preferable that the teacher's finger puppets be of a high quality construction. Preferably the teacher's finger puppets are pre-made as a full set. The base portion 130 of puppet 120 can be a tube, or more preferably, a pocket having an open bottom, a cylindrical sidewall, and a closed top. The letters can be sewn, embroidered or otherwise affixed to the base 130, and the objects 150 firmly attached to the base 130. Additionally, it is desirable that the teacher's finger puppets have objects that face both forward and rearward to facilitate the teacher's ability to demonstrate and teach.

Figure 4:
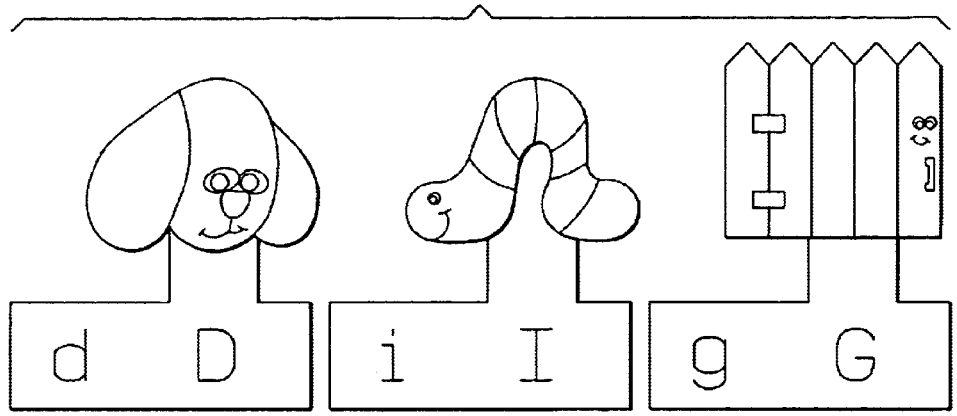
FIG. 4 shows three unassembled finger puppets aligned to spell the word "dig."

FIG. 4 shows three finger puppets arranged to form the word "dig." The object corresponding to the letter "d" is a dog, the object corresponding to the letter "i" is an inch worm and the object corresponding to the letter "g" is a gate. Again, any other objects that provide the proper sounds can be utilized. The objects can be permanently or removably affixed to the bases as desired.

Figure 5:
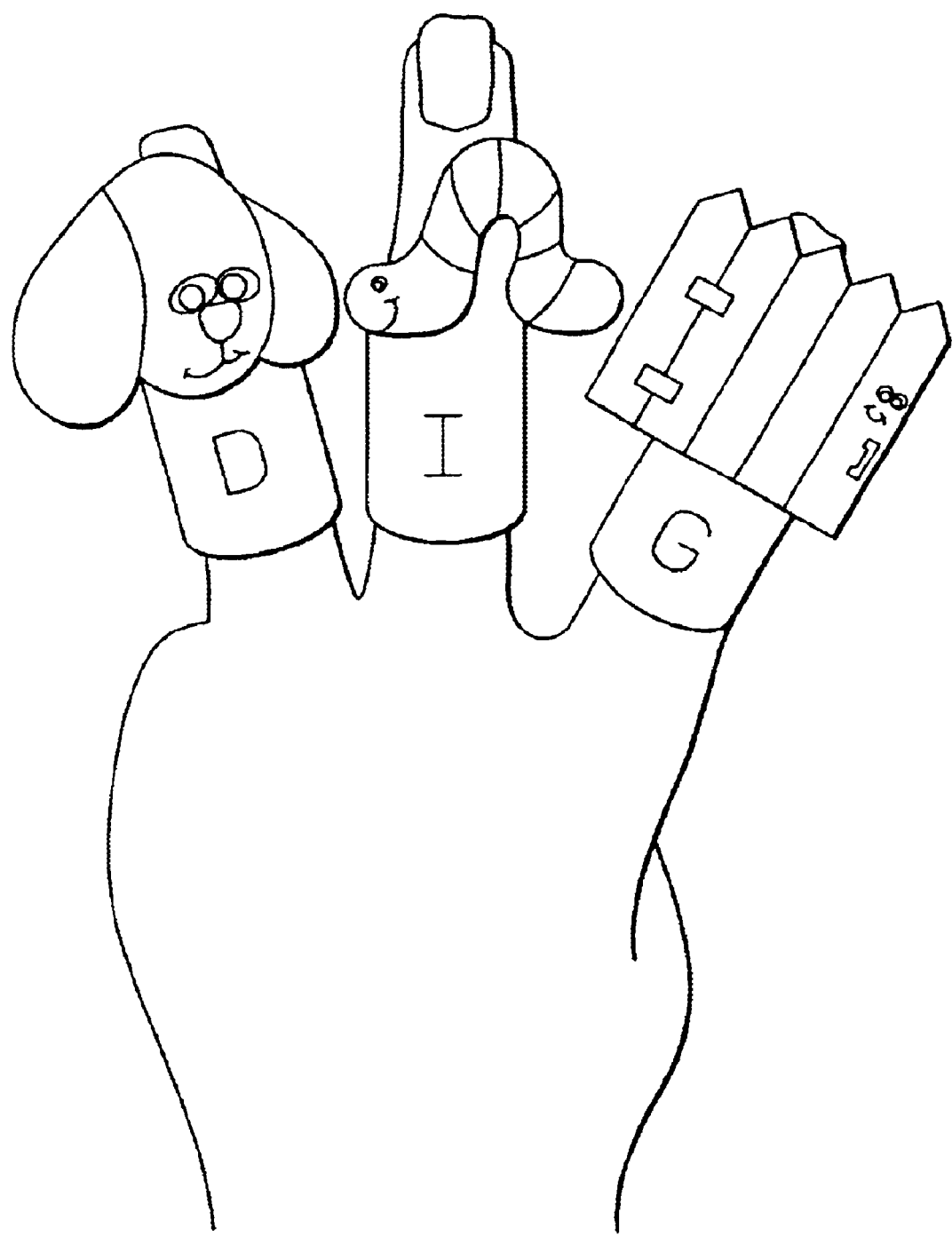
FIG. 5 shows the finger puppets in FIG. 4 assembled and positioned on a student's fingers.

FIG. 5 shows the finger puppets shown in FIG. 4 arranged and attached to a wearer's fingers such that the word "dig"

is spelled and the objects corresponding thereto are positioned so that the word "dig" could be sounded out by a user that is learning to read by pronouncing the beginning sounds of the words "dog," "inch worm," and "gate."

Figure 6:
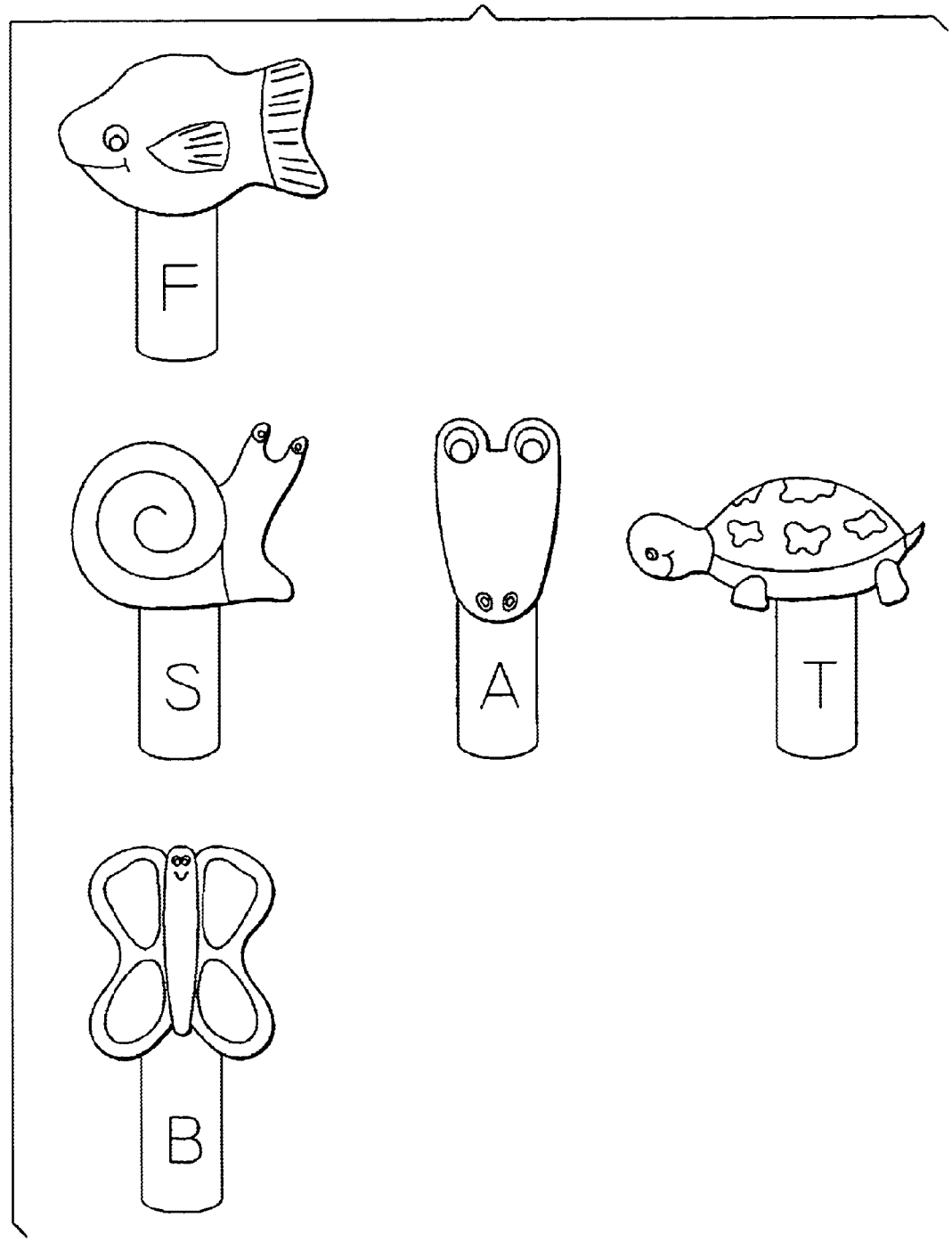
FIG. 6 shows finger puppets bearing the letters "f," "s" and "b" all arrangeable with finger puppets bearing the letters "a" and "t" to create the words "fat," "sat" and "bat."

FIG. 6 shows finger puppets for the letters "f," "s" and "b" in a first column followed by the finger puppets for "a" and "t." The object for the letter "f" is a fish, the object for the letter "s" is a snail and the object for the letter "b" is a butterfly. The object for the letter "a" is an alligator and the object for the letter "t" is a turtle. As can be seen, the letters "f," "s" or "b" can be used with the letters "a" and "t" to form the words "fat," "sat" and "bat."

Figure 7:
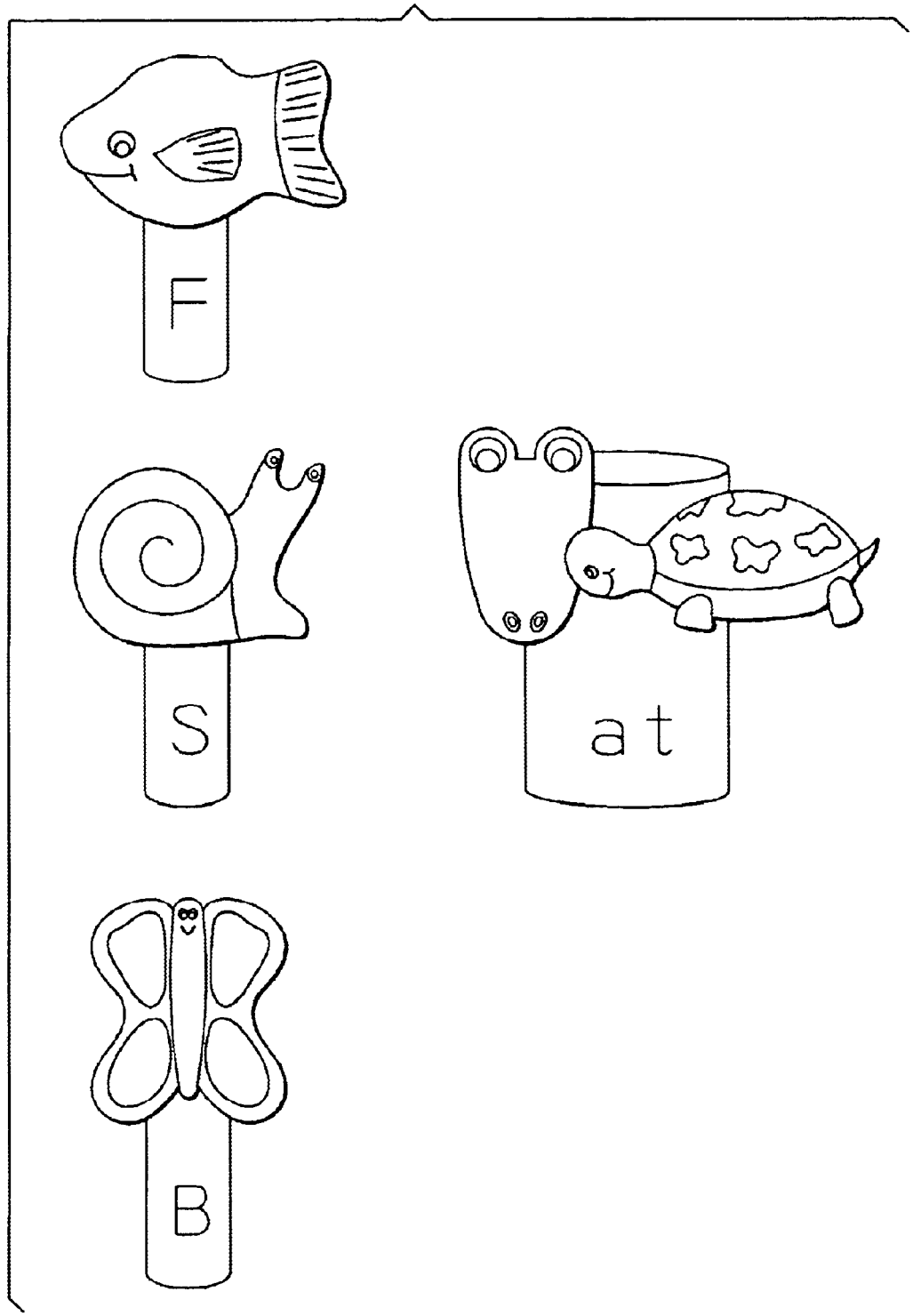
FIG. 7 shows finger puppets bearing the letters "f," "s" and "b" all of which could be used with a finger puppet bearing the word family "at" to produce the words "fat," "sat" and "bat."

As shown in FIG. 7, the letters "a" and "t" can be represented on one finger puppet as the word family "at" and the sound can be indicated by positioning two objects such as an alligator and turtle together on the finger puppet. Then, like in FIG. 6, the words "fat," "sat" and "bat" can be formed.

Figure 8:
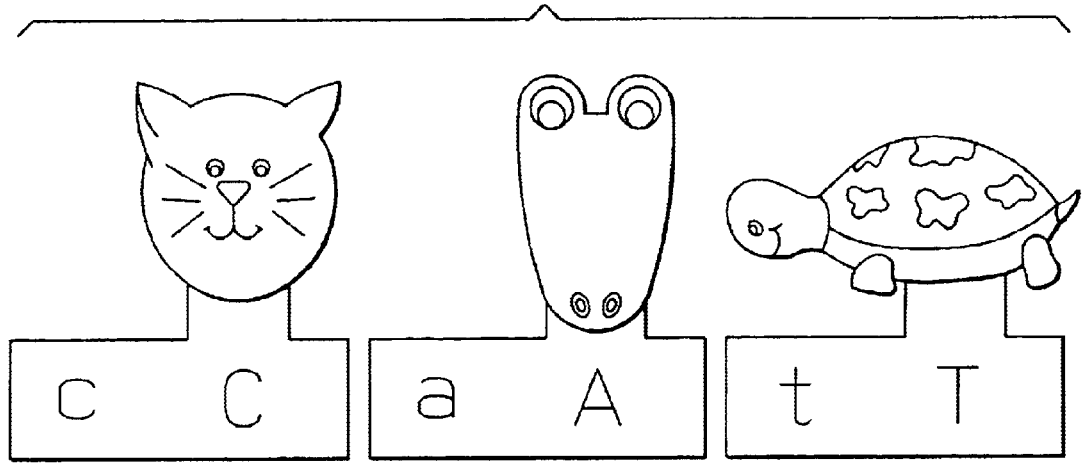
FIG. 8 shows unassembled finger puppets bearing the letters "c," "a" and "t" arranged to form the word "cat."

FIG. 8 shows the finger puppets for the word "cat." In this case, the letter "c" is shown with reference to the object of a cat and again, the letters "a" and "t" are cued by the objects alligator and turtle respectively.

Figure 9:
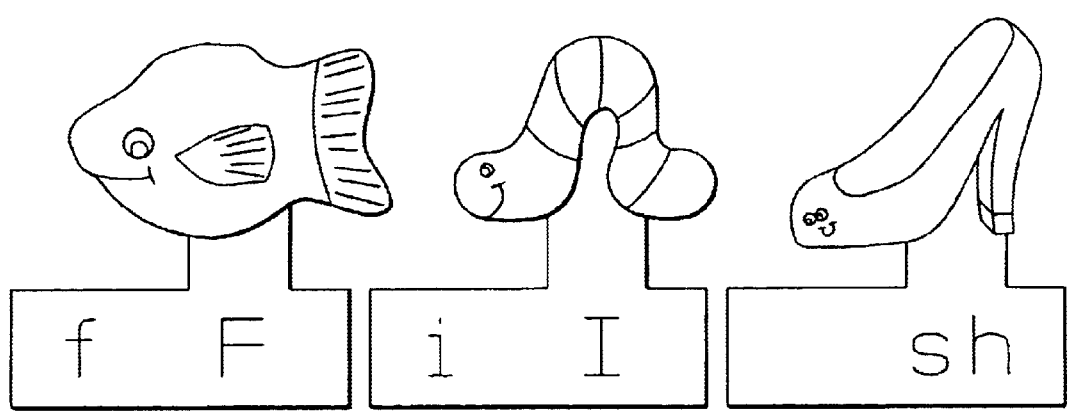
FIG. 9 shows unassembled finger puppets bearing the letters "f" and "i" along with a finger puppet bearing the digraph "sh" to produce the word "fish."

FIG. 9 shows the word "fish" spelled out by the letter "f" whose object is a fish, the letter "i" whose object is an inch worm, and the digraph "sh" shown by the object shoe.

Figure 10:
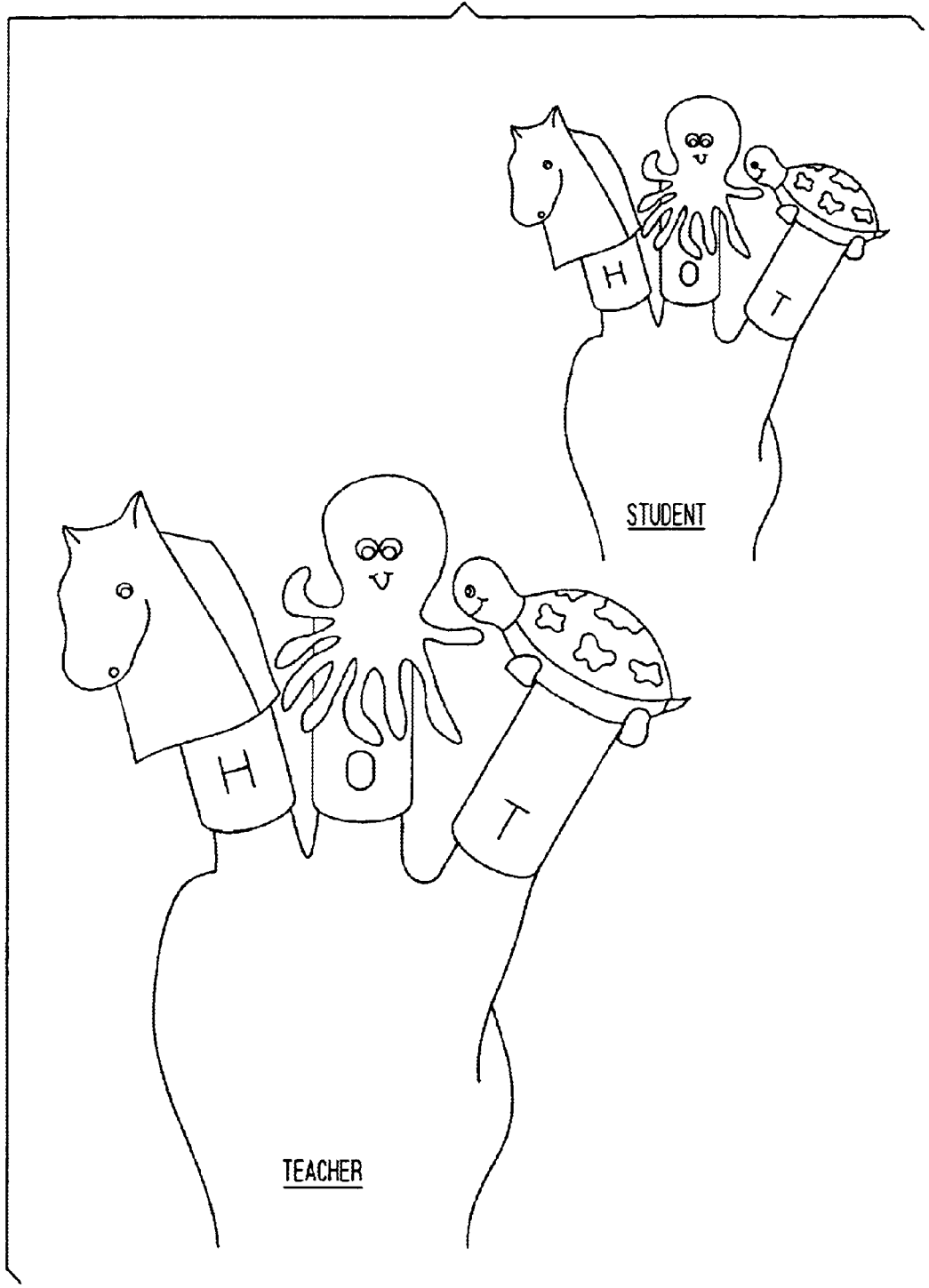
FIG. 10 is a perspective view showing a teacher wearing finger puppets arranged to spell the word "hot" and a student wearing finger puppets arranged to spell the word "hot."

FIG. 10 is a perspective view showing a teacher's hand bearing puppets and a student's hands with puppets. In each case, both the student's and the teacher's puppets show the letters "h," "o" and "t" to spell the word "hot." The objects corresponding to the letters include a horse, an octopus and a turtle. When the first sounds of the objects are pronounced, the word "hot" results. As can be seen, the student places the puppets relating to the word on his or her fingers and the teacher does likewise. Thus the teacher, with respect to the student, is either demonstrating how to properly place the puppets on the fingers or provide confirmation to the student that the student's actions are correct.

In use, a student is presented with a word such as the word "hot." The student will then locate the finger puppets corresponding to the letters and will place the finger puppet letters "h," "o" "t" on its fingers. The teacher will do likewise either leading the student by demonstration or providing an example that confirms what the student has already done. The student will then attempt to read the word, i.e. sound the word out. As such, the student will know that it must pronounce each of the letters corresponding to the finger puppets that it is wearing. For the letter "h" the student could be cued by the object horse to make the "h" sound. Then, for the letter "o" the student could be cued by the image of an octopus to make the "o" sound. Finally, to pronounce the "t," the student could be cued by the turtle to say "t." Putting the sounds together, the student will come up with the word "h" "o" "t."

The puppets can be used to teach beginning sounds, middle sounds and ending sounds. Spelling blends such as diphthongs, digraphs, phonograms, word families, compound words and contractions can also be taught.

Importantly, the students using the finger puppets gain confidence and are actively involved in the hands-on activity of discovering words. This promotes the development of reading skills.

Figure 11:
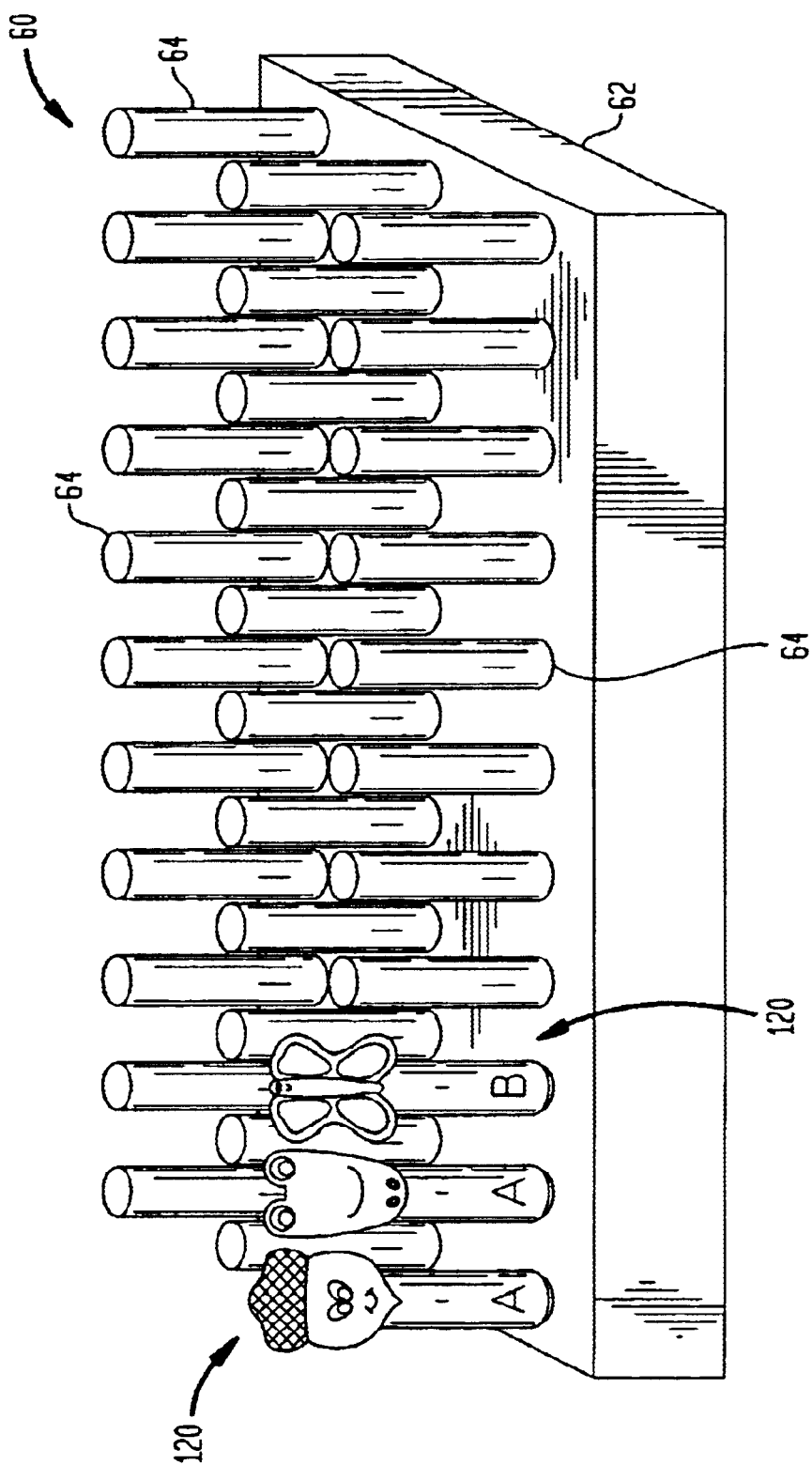
FIG. 11 is a perspective view of a peg stand for use in holding and displaying finger puppets of the present invention, typically a teacher's finger puppets.

FIG. 11 shows a stand 60 for holding, displaying and storing the finger puppets when not in use. The stand 60 includes a base 62 and a plurality of upstanding pegs 64 for supporting finger puppets 120. The stand 60 can be made of any suitable material such as wood. The stand 60 is preferably used in connection with a teacher's puppets. Instead of pegs 64, any other suitable support could be used such as pipe cleaners, etc.

Having thus described the invention in detail, it is to be understood that the foregoing description is not intended to limit the spirit and scope thereof. What is desired to be protected by Letters Patent is set forth in the appended claims.

What is claimed is:

1. A reading learning tool for teaching a student to read a word comprising:
    a plurality of finger puppets for placement on fingers of a student;
    at least one letter on each finger puppet;
    an image of an object on each finger puppet, the name of the object providing a cue to the pronunciation of the at least one letter on the same finger puppet;
    the finger puppets sized and adapted to be placed on a student's fingers so that the at least one letter on adjacent finger puppets form the word and the name of the image on each finger puppet provides a cue to the pronunciation of the at least one letter on the finger puppet.

2. The tool of claim 1 wherein the finger puppets are made of paper.

3. The tool of claim 1 further comprising a second plurality of finger puppets with letters thereon to be worn by a teacher.

4. The tool of claim 3 wherein the second plurality of finger puppets is made of durable material.

5. The tool of claim 3 wherein the second plurality of finger puppets includes images of objects corresponding to the sounds of the letters.

6. The tool of claim 1 wherein the finger puppets include two images of the object, and the images are positioned to face forward and rearward.

7. The tool of claim 1 wherein the at least one letter appears in uppercase and lowercase on each finger puppet.

8. The tool of claim 9 wherein the uppercase and lowercase letters appear on opposite sides of the finger puppet.

9. The tool of claim 1 wherein the at least one letter comprises a sound blend.

10. The tool of claim 9 wherein the sound blend is a digraph or diphthong.

11. The tool of claim 2 wherein each finger puppet comprises a base having interlocking ends, and wherein the ends are interlocked to form a cylindrical band through which the student's finger may be inserted.

12. The tool of claim 11 wherein the at least one letter appears twice on the finger puppet, one letter facing in a forward direction and one letter facing in a rearward direction.

13. The tool of claim 11 wherein the image of the object appears twice on the finger puppet, one image facing in a forward direction and one image facing in a rearward direction.

14. The tool of claim 13 wherein the at least one letter appears as an upper case letter on one side of the finger puppet and as a lowercase letter on the other side of the finger puppet.

15. The tool of claim 2 further comprising a second plurality of finger puppets with letters thereon to be worn by a teacher.

16. The tool of claim 15 wherein the second plurality of finger puppets is made of durable material.

17. The tool of claim 15 wherein the second plurality of finger puppets includes images of objects corresponding to the sounds of the letters.

18. A method of teaching a student to read a word comprising:

provinding a plurality of finger puppets, each finger puppet having at least one letter and an image of an object, the name of the object corresponds to the sound of the letter to assist a student to sound out the word being read;

selecting finger puppets with letters corresponding to the word;

placing the finger puppets whith letters corresponding to the word on a student's fingers to spell the word using plural puppets placed on plural fingers; and pronouncing the sound of each letter on each puppet on each finger in sequence by pronouncing the first sound of the name of each object to sound out the word being read.

19. The method of claim 10 further comprising providing finger puppet blanks on a printed sheet of paper and separating the finger puppets from the sheet of paper.

20. The method of claim 12 wherein separating the finger puppets comprises cutting the finger puppets from the sheet of paper.

21. The method of claim 12 wherein separating the finger puppets comprises severing perforations.

22. The method of claim 12 farther comprising coloring the finger puppets.

23. The method of claim 10 further comprising providing a second plurality of finger puppets for a teacher so that a teacher can instruct and/or confirm a student's actions.

24. The method of claim 16 further comprising placing some of the second plurality of finger puppets on a teacher's fingers.

25. The method of claim 12 further comprising interlocking ends of a base portion of the finger puppet to form a cylindrical band, and inserting a student's finger through the band.

26. The method of claim 25 wherein the step of interlocking the ends of the base portion comprise adhering the ends together.

27. The method of claim 25 wherein the step of adhering the ends together comprises taping the ends together.

28. A method of teaching a student to read a word comprising:

selecting a word;

providing a plurality of finger puppets for the student, each finger puppet having at least one letter and an image of an object that provides a cue to the sound of the letter;

providing a plurality of finger puppets for a teacher each finger puppet having at least one letter and an image of an object that provides a cue to the sound of the letter;

selecting finger puppets having letters comprising the selected word;

placing the finger puppets on the teacher's fingers to spell the word on the teacher's fingers;

placing finger puppets on the student's fingers corresponding to the puppets on the teacher's fingers to spell the word; and pronouncing the sound of each letter on each puppet on each finger of the student in sequence by pronouncing the first sound of the name of the object on each puppet to read the word.

\* \* \* \* \*

UNITED STATES PATENT AND TRADEMARK OFFICE
CERTIFICATE OF CORRECTION

PATENT NO. : 6,951,464 B2
APPLICATION NO. : 10/113727
DATED : October 4, 2005
INVENTOR(S) : Diana Cubeta, Susan McGuirl and Cynthia Swajkowski It is certified that error appears in the above-identified patent and that said Letters Patent is hereby corrected as shown below:

Column 2, line 30, after the word FIG., delete "11" and replace with --1I.--

Column 6, line 39, after the word claim, delete "9" and replace with --7.--

Column 7, line 9, after the word puppets, delete "whith" and replace with --with.--.

Column 7, line 16, after the word claim, delete "10" and replace with --18.--

Column 7, line 19, after the word claim, delete "12" and replace with --19.--

Column 7, line 22, after the word claim, delete "12" and replace with --19.--

Column 7, line 24, after the word claim, delete "12 farther" and replace with --19 further.--

Column 7, line 26, after the word claim, delete "10" and replace with --18.--

Column 7, line 29, after the word claim, delete "16" and replace with --23.--

Column 7, line 32, after the word claim, delete "12" and replace with --19.--

Column 8, line 4, after the word claim, delete "25" and replace with --26.--

Signed and Sealed this

Sixteenth Day of January, 2007

JON W. DUDAS
*Director of the United States Patent and Trademark Office*